US007626539B2

(12) United States Patent  
de Salas

(10) Patent No.: US 7,626,539 B2
(45) Date of Patent: Dec. 1, 2009

(54) METHOD AND APPARATUS FOR MANAGING TIME IN A SATELLITE POSITIONING SYSTEM

(75) Inventor: Javier de Salas, Madrid (ES)

(73) Assignee: Global Locate, Inc., San Jose, CA (US)

( * ) Notice: Subject to any disclaimer, the term of this patent is extended or adjusted under 35 U.S.C. 154(b) by 0 days.

(21) Appl. No.: 11/941,552

(22) Filed: Nov. 16, 2007

(65) Prior Publication Data

US 2008/0169979 A1  Jul. 17, 2008

Related U.S. Application Data

(63) Continuation-in-part of application No. 10/976,191, filed on Oct. 28, 2004, now Pat. No. 7,327,310.

(60) Provisional application No. 60/518,180, filed on Nov. 7, 2003.

(51) Int. Cl.
   *G01S 1/02* (2006.01)
(52) U.S. Cl. .............................. 342/357.02; 342/357.12
(58) Field of Classification Search ............ 342/357.02, 342/357.06, 357.12, 357.15, 357.13; 701/213, 701/215
   See application file for complete search history.

(56) References Cited

U.S. PATENT DOCUMENTS

| 5,945,948 A * | 8/1999 | Buford et al. ............... 342/457 |
| 2004/0087277 A1* | 5/2004 | Edge et al. ............... 455/67.16 |
| 2004/0185873 A1* | 9/2004 | Gilkes et al. ............. 455/456.2 |

* cited by examiner

*Primary Examiner*—Dao L Phan
(74) *Attorney, Agent, or Firm*—McAndrews Held & Malloy, Ltd.

(57) ABSTRACT

A method, apparatus and system for time management in a position-location system is described. The method may include (i) obtaining, at a global-navigation-satellite-system receiver while being served by a first node of a wireless network a first time base, a relative-time difference, and a third time base; and forming a time relation as a function of the first time base, relative-time difference ("RTD") and third time base. The first time base is associated with the first node, and may be, for example, a time base associated with an air interface for communicating with the first node. The RTD may be a difference between the first time base and a second time base associated with a second node of the wireless network. The third time base is associated with a constellation of satellites, and may be, for example, an absolute time associated with the constellation of satellites. The method may include using knowledge of a GNSS time to enhance sensitivity or time to first position of a GNSS receiver.

27 Claims, 8 Drawing Sheets

METHOD AND APPARATUS FOR MANAGING TIME IN A SATELLITE POSITIONING SYSTEM

CROSS-REFERENCE TO RELATED APPLICATIONS

This application is a continuation-in-part application of U.S. patent application Ser. No. 10/976,191, filed on Oct. 28, 2004, now U.S. Pat. No. 7,327,310 which claims benefit of U.S. Provisional Patent Application Ser. No. 60/518,180, filed Nov. 7, 2003, both of which are incorporated herein by reference in their entireties.

BACKGROUND OF THE INVENTION

1. Field of the Invention

Embodiments of the present invention generally relate to satellite position location systems and, more particularly, to a method and apparatus for managing time in a Global-Navigation-Satellite System.

2. Description of the Related Art

Global-Navigation-Satellite-System (GNSS) receivers, such as Global Positioning System (GPS) receivers, use measurements from several satellites to compute position. GNSS receivers normally determine their position by computing time delays between transmission and reception of signals transmitted from satellites and received by the receiver on or near the surface of the earth. The time delays multiplied by the speed of light provide the distance from the receiver to each of the satellites that are in view of the receiver.

For example, each GPS signal available for commercial use utilizes a direct sequence spreading signal defined by a unique pseudo-random noise (PN) code (referred to as the coarse acquisition (C/A) code) having a 1.023 MHz spread rate. Each PN code bi-phase modulates a 1575.42 MHz carrier signal (referred to as the L1 carrier) and uniquely identifies a particular satellite. The PN code sequence length is 1023 chips, corresponding to a one millisecond time period. One cycle of 1023 chips is called a PN frame or epoch.

GPS receivers determine the time delays between transmission and reception of the signals by comparing time shifts between the received PN code signal sequence and internally generated PN signal sequences. These measured time delays are referred to as "sub-millisecond pseudoranges", since they are known modulo the 1 millisecond PN frame boundaries. By resolving the integer number of milliseconds associated with each delay to each satellite, then one has true, unambiguous, pseudoranges. A set of four pseudoranges together with a knowledge of absolute times of transmission of the GPS signals and satellite positions in relation to these absolute times is sufficient to solve for the position of the GPS receiver. The absolute times of transmission (or reception) are needed in order to determine the positions of the GPS satellites at the times of transmission and hence to compute the position of the GPS receiver.

Accordingly, each of the GPS satellites broadcasts information regarding the satellite orbit and clock data known as the satellite navigation message. The satellite navigation message is a 50 bit-per-second (bps) data stream that is modulo-2 added to the PN code with bit boundaries aligned with the beginning of a PN frame. There are exactly 20 PN frames per data bit period (20 milliseconds). The satellite navigation message includes ephemeris data, which identifies the satellites and their orbits, as well as absolute time information (also referred to herein as "GPS time", "satellite time", or "time-of-day") associated with the satellite signals. The absolute time information is in the form of a second of the week signal, referred to as time-of-week (TOW). This absolute time signal allows the receiver to unambiguously determine a time tag for when each received signal was transmitted by each satellite.

In some GPS applications, the signal strengths of the satellite signals are so low that either the received signals cannot be processed, or the time required to process the signals is excessive. As such, to improve the signal processing, a GPS receiver may receive assistance data from a network to assist in satellite signal acquisition and/or processing. For example, the GPS receiver may be integrated within a cellular telephone and may receive the assistance data from a server using a wireless communication network. This technique of providing assistance data to a remote mobile receiver has become known as "Assisted-GPS" or A-GPS.

In some A-GPS systems, the wireless communication network that provides the assistance data is not synchronized to GPS time. Such non-synchronized networks include time division multiple access (TDMA) networks, such as GSM networks, universal mobile telecommunications system (UMTS) networks, North American TDMA networks (e.g., IS-136), and personal digital cellular (PDC) networks.

In these types of networks, absolute time information is presently obtained at the base stations of such wireless networks using co-located location measurement units (LMUs). Each of these conventional LMUs includes a GPS receiver that is used to receive and decode the TOW information from the satellites in view of the base stations that are near the LMU. The conventional LMU then computes an offset between GPS time and the local time at such base stations. The offset is then supplied to the base stations, which in turn, use the offset to correct their local time. One disadvantage associated with conventional LMUs is that the wireless communication network typically includes many thousands of base stations, thus requiring many conventional LMUs. Providing a large number of conventional LMUs is significantly expensive, and is thus undesirable.

Therefore, there exists a need in the art for a method and apparatus that manages time within an assisted GNSS without employing conventional LMUs.

SUMMARY

A method, apparatus and system for time management in a position-location system is described. The method may include obtaining, at a given global-navigation-satellite-system ("GNSS") receiver while being served by a first node of a wireless network (e.g., a first base station), a first time base, a relative-time difference, and a third time base; and forming a time relation as a function of the first time base, the relative-time difference ("RTD") and the third time base.

The first time base is associated with the first node, and may be, for example, a time base associated with an air interface used for communicating with the first node. The RTD may be a difference between the first time base and a second time base associated with a second node (e.g., a second and/or neighboring base station) of the wireless network. The RTD may be obtained from measurements provided by the wireless network during a handover from the first node to the second node. The RTD may be or be formed from, for example, Enhanced-Observed-Time-Difference ("EOTD") measurements if the wireless network is embodied as a global system for mobile communications ("GSM") or universal mobile telecommunications system ("UMTS") network or Observed-Time-Difference-of-Arrival ("OTDA") measurements if the wireless network is embodied as a wideband code division multiple access (CDMA) network.

The third time base is associated with a constellation of satellites. The third time base may be or be formed from, for example, an absolute time associated with the constellation of satellites ("GNSS system time"). This GNSS system time may be obtained by decoding satellite signals received from one or more satellites of the constellation. Alternatively, the third time base may be an estimate of the GNSS system time maintained by the given GNSS receiver.

The method may also include storing at the GNSS receiver the time relation, whereby, the GNSS receiver is adapted to compute its position ("receiver position") as a function of the time relation. In addition, the method may include providing the time relation from the GNSS receiver to a database for subsequent distribution to a second GNSS receiver.

The apparatus may include a receiver for the GNSS ("GNSS receiver"). The GNSS receiver, in turn, may include memory adapted to store executable instructions, and a processor operable to obtain from the memory the executable instructions and execute the executable instructions. The executable instructions include executable instructions to (i) obtain the first time base, the relative-time difference, and the third time base while being served by a first node of a wireless network; and (ii) form a time relation as a function of the first time base, the relative-time difference and the third time base.

Accordingly, the GNSS receiver may compute the receiver position (e.g., a geographic position) and/or an estimate of the error of its own clock with respect to the GNSSS system time. The GNSS receiver can then easily associate the GNSS system time with, for example, the air interface time of the first node.

Although the foregoing includes only one RTD, the method, apparatus and system may be extended to more than one RTD, in which the additional RTDs represent a difference between the first time base and time bases for other (e.g., neighboring) nodes of the wireless network. This way, the GNSS receiver and/or the database may extend the relationship between the GNSS system time and the time bases of such other nodes. dr

BRIEF DESCRIPTION OF THE DRAWINGS

So that the manner in which the above recited features are attained and can be understood in detail, a more detailed description, which is briefly summarized above, is described below with reference to the Figures illustrated in the appended drawings.

It is to be noted that the Figures in the appended drawings, like the detailed description, are examples. And as such, the Figures and the detailed description are not to be considered limiting, and other equally effective examples are possible and likely. Furthermore, like reference numerals in the Figures indicate like elements: wherein.

DETAILED DESCRIPTION

A method and apparatus for managing time in a Global-Navigation-Satellite System (GNSS) is described. Those skilled in the art will appreciate that the invention may be used with various types of mobile or wireless devices that are "location-enabled," such as cellular telephones, pagers, laptop computers, personal digital assistants (PDAs), and like type wireless devices known in the art. Generally, a location-enabled mobile device is facilitated by including in the device the capability of processing GNSS satellite signals.

A GNSS receiver, such as remote receiver 102A, 102B and 200 (below), acquires a satellite signal by searching a given search space, which may be defined as some or all possible time delays associated with the time of travel ("travel time") of such satellite signal from a satellite. The travel time is proportional to a range (in distance) from the GNSS receiver to the satellite. Precise knowledge of GNSS system time can be used by the GNSS receiver to reduce the search space of such delays, and hence, decrease the amount time for acquiring the satellite signal. In addition, if the search space is small (typically on the order of tens of microseconds), the satellite signal can be integrated to increase sensitivity of the GPS receiver.

A less precise knowledge of GNSS system time (e.g., few milliseconds) may be used to time stamp measurements for determining the range and computing the receiver position, and obviates the need for the GNSS receiver to demodulate or otherwise decode the GNSS system time from the satellite signal. Obviating the need to demodulate or otherwise decode the GNSS system time, decreases the amount of time the GNSS receiver employs before a first receiver position is computed and/or delivered to a user of the GNSS receiver.

Figure 1:
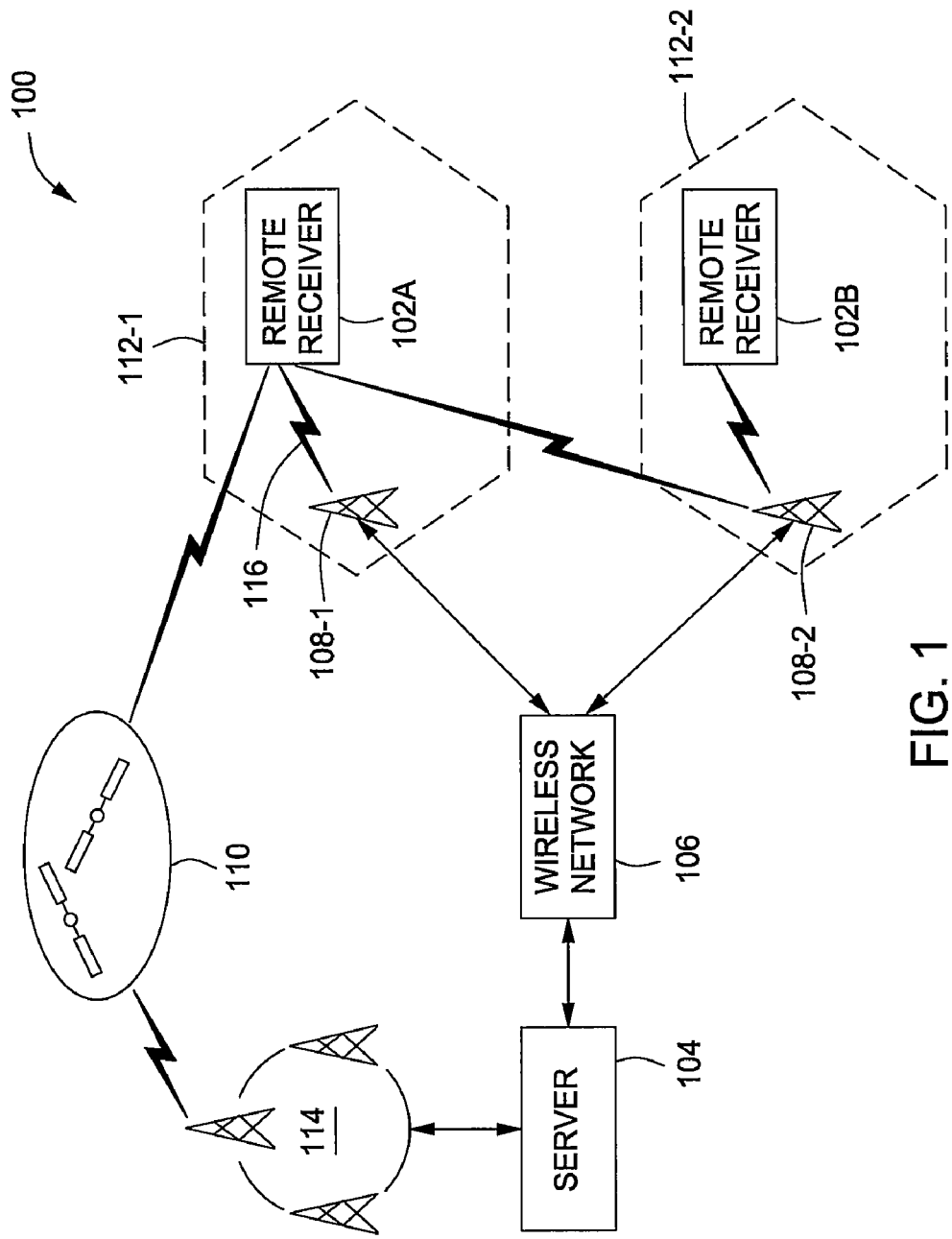
FIG. 1 is a first block diagram depicting an example of a position location system.

FIG. 1 is a block diagram depicting an example of a position-location system 100, such as a Global Navigation Satellite System (GNSS). The system 100 illustratively comprises remote receivers 102A and 102B (collectively referred to as remote receivers 102) in communication with a server 104 via a wireless communication network 106 (e.g., a cellular telephone network). The server 104 may be disposed in a serving mobile location center (SMLC) of the wireless communication network 106.

The remote receivers 102 obtain satellite measurement data with respect to a plurality of satellites 110 (e.g., pseudo-ranges, Doppler measurements). The server 104 obtains satellite navigation data for the satellites 110 (e.g., orbit trajectory information, such as ephemeris). Position information for the remote receivers 102 is computed using the satellite measurement data and the satellite navigation data.

The wireless communication network 106 typically comprises a non-synchronized communication network (i.e., the network is not synchronized with satellite time). The wireless communication network 106 includes a plurality of nodes or base stations; two of which are illustratively shown as a first base station 108-1, which has a first service area 112-1, and a second base station 108-2, which has a second service area 112-2. The base stations 108-1, 108-2 of the wireless communication network 106 may also be referred to herein as "cell sites".

For purposes of clarity by example, the wireless communication network 106 is shown as including only two service areas. It is to be understood, however, that the wireless communication network 106 may include any number of service areas that serve any number of remote receivers; each of which may operate and/or be located in the same or a different one of the service areas. Each of these remote receivers may function as either the remote receiver 102A or the remote receiver 102B. In addition, the remote receiver 102A may function as the remote receiver 102B, and the remote receiver 102B may function as the remote receiver 102A.

The remote receiver 102A is illustratively shown as being within the first service area 112-1, in which wireless links 116-1 may be established between the remote receiver 102A and the base station 108-1. The remote receiver 102A may be adapted to register with the base station 108-1 via the wireless links 116-1.

Communication between the base station 108-1 and the remote receiver 102A may be facilitated via a wireless signal having a first time base that is associated with the first base station 108-1. This first time base may be, include or be formed from a particular timing structure associated with an air interface of the wireless network ("air-interface timing").

In one embodiment, the wireless communication network 106 may comprise a global system for mobile communications (GSM) network. For a base station in a GSM network, the air-interface timing of a wireless signal is defined by a frame number, a timeslot number, and a bit number. A frame has a duration of 4.615 milliseconds, a timeslot has a duration of 577 microseconds, and a bit has a duration of 3.69 microseconds. A GSM base station includes clock for managing its air-interface timing in a synchronous manner. The clock used by the GSM base station is a highly controlled and exhibits a low long term drift rate. Frequency offset errors are usually less than 0.05 parts per million (ppm), and long term drift rates are even lower. The GSM base stations and the air-interface timing of their communications are well known in the art.

Various other types of non-synchronized wireless networks exhibit air-interface timing structures similar to GSM, including, but not limited to, universal mobile telecommunications system (UMTS) networks, North American time division multiple access (TDMA) networks (e.g., IS-136), and personal digital cellular (PDC) networks. For purposes of clarity by example, various aspects of the invention are described with respect to GSM. It is to be understood, however, that the present invention may be used with other types of wireless networks, such as code division multiple access (CDMA), wideband CDMA, UMTS, TDMA, PDC and like networks.

Although the remote receiver 102A is shown as being within the first service area 112-1, the remote receiver 102A may be able to detect signals, such emanating from the second base station 108-2. This may occur, for instance, by the remote receiver 102A moving into the second service area 112-2 and establishing wireless links 116-2 or, simply, by being in a location in the first service area 112-1 where attenuation of the signals emanating from the second base station 108-2 is limited so that the remote receiver 102A can detect such signals. Communication between the base station 108-2 and the remote receiver 102A may be facilitated via another wireless signal having a second time base that is associated with the second base station 108-2. The second time base may be, include or be formed from the air-interface timing that is associated with the second base station 108-2.

In addition to above, the remote receiver 102A, when registered with or otherwise served by the first base station 108-1, may be adapted to measure or otherwise obtain (i) one or more power levels associated with the first and/or second base stations 108-1, 108-2, and/or (ii) one or more time differences between the first time base ("serving-time base") and the second time base ("neighbor-time base"). The remote receiver 102A may be further adapted to form a relative-time difference (RTD) as a function of the serving-time base and the neighbor-time base.

The remote receiver 102A may also be adapted to provide or "up link" to the wireless network 106 the RTD, the serving-time base and/or the neighbor-time base for handover purposes. In addition, the remote receiver 102A may be adapted to provide to the server 104 the RTD, the serving-time base and/or the neighbor-time base.

The remote receiver 102B is illustratively shown as being within the second service area 112-2, in which wireless links 116-2 may be established between the remote receiver 102B and the base station 108-2. The remote receiver 102B may be adapted to register with the base station 108-2 via the wireless links 116-2. Communication between the base station 108-2 and the remote receiver 102B may be facilitated via the wireless signal having the second time base.

Satellite navigation data, such as ephemeris for at least the satellites 110, may be collected by a network of tracking stations ("reference network 114"). The reference network 114 may include several tracking stations that collect satellite navigation data from all the satellites in the constellation, or a few tracking stations, or a single tracking station that only collects satellite navigation data for a particular region of the world. An exemplary system for collecting and distributing ephemeris is described in commonly-assigned U.S. Pat. No. 6,411,892, issued Jun. 25, 2002, which is incorporated by reference herein in its entirety. The reference network 114 may provide the collected satellite navigation data to the server 104.

The remote receivers 102 may be configured to receive assistance data from the server 104 via the wireless network 106. For example, the remote receivers 102 may receive acquisition assistance data, satellite trajectory data, or both from the server 104.

Acquisition assistance data (i.e., data configured to assist the remote receiver 102 in detecting and processing satellite signals from the satellites 110) may be computed by the server 104 using satellite trajectory data (e.g., ephemeris or other satellite trajectory model). For example, the acquisition assistance data may include expected pseudoranges (or code phases) from the satellites 110 to an assumed (e.g., an approximate) position of a respective one of the remote receivers 102 at an assumed time-of-day, and/or a model of expected pseudoranges (e.g., pseudorange model). Exemplary processes for forming pseudorange models as acquisition assistance data are described in commonly-assigned U.S. Pat. No. 6,453,237, issued Sep. 17, 2002, which is incorporated by reference herein in its entirety.

Satellite trajectory assistance data may include ephemeris, Almanac, or some other orbit model. Notably, the satellite trajectory data may comprise a long term satellite trajectory model, as described in commonly-assigned U.S. Pat. No. 6,560,534, issued May 6, 2003, which is incorporated by reference herein in its entirety.

The position-location system 100 may be configured in multiple modes of operation. In one embodiment, the remote receivers 102 obtain satellite measurements (e.g., pseudoranges) and send the satellite measurements to the server 104 through the wireless network 106, where the server 104 computes a position of the remote receivers 102 (referred to as a mobile station assisted or "MS-Assisted" configuration).

In another embodiment, the remote receivers 102 obtain satellite trajectory data from the server 104, and obtain the satellite measurements (e.g., pseudoranges) from the satellites 110. The remote receivers 102 use the satellite measurements and the satellite trajectory data to locate their own position (referred to as a mobile station based or "MS-Based" configuration).

In yet another embodiment, the remote receivers 102 may obtain satellite trajectory data directly from the satellites 110 and locate their own position (referred to as the "autonomous" configuration). Furthermore, the remote receiver 102A may operate in a different mode than the remote receiver 102B. Regardless of the configuration employed (i.e., MS-assisted, MS-based, or autonomous), the position-location system 100 may employ various embodiments for managing time, as described below, to obtain a sufficiently accurate estimate of satellite time, which is also commonly referred to as "absolute time".

Figure 2:
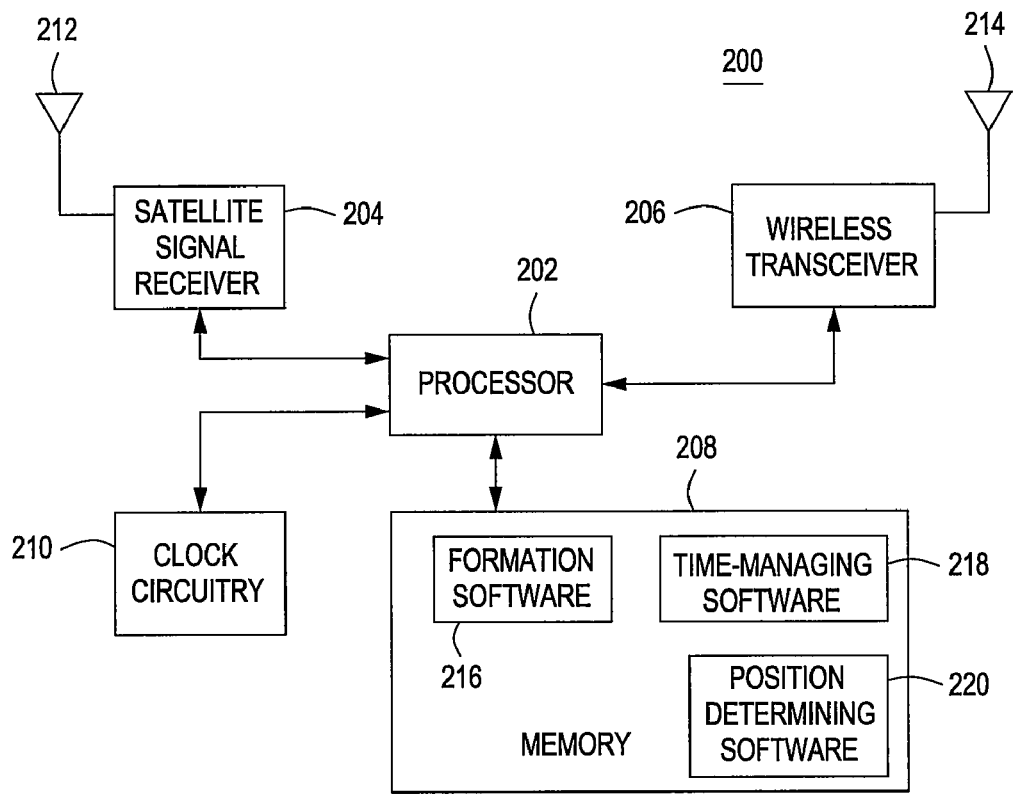
FIG. 2 is a second block diagram depicting an example of a remote receiver of a position-location system.

FIG. 2 is a block diagram depicting an example of a remote receiver 200 of a position-location system, such as receiver for a GNSS. The remote receiver 200 may be used as either or both of the remote receivers 102 of FIG. 1.

The remote receiver 200 illustratively comprises a satellite signal receiver 204, a wireless transceiver 206, a processor 202, a memory 208, and clock circuitry 210. The satellite signal receiver 204 receives satellite signals from the satellites 110 using an antenna 212. The satellite signal receiver 204 may comprise a conventional A-GPS receiver. An exemplary A-GPS receiver is described in U.S. Pat. No. 6,453,237, referenced above.

The wireless transceiver 206 receives wireless signals from the base stations 108-1, 108-2 of the wireless communication network 106 via an antenna 214. The satellite signal receiver 204 and the wireless transceiver 206 may be controlled by the processor 202.

The processor 202 may comprise a microprocessor, instruction-set processor (e.g., a microcontroller), or like type processing element known in the art. The processor 202 is coupled to the memory 208 and the clock circuitry 210. The memory 208 may be random access memory, read only memory, removable storage, hard disc storage, or any combination of such memory devices. The memory 208 may be adapted to store the RTD, the serving-time relation and/or the neighbor-time relation.

Various processes and methods described herein may be implemented via software, such as (i) time-relation-forming software 216 for performing some or all of a time-relations-forming process (e.g., a process illustratively set forth in FIG. 4), (ii) managing-time software 218 for performing some or all of a managing-time process (e.g., process illustratively set forth in FIG. 8), (ii) position-determining software 220 for performing some or all of a position-determining process (e.g., processes illustratively set forth in FIGS. 5, 6, 7 and 9). This software 216-220 may be stored in the memory 208 for execution by the processor 202. Alternatively, such processes and methods may be implemented using dedicated hardware, such as an application specific integrated circuit (ASIC), or a combination of hardware and software. The clock circuitry 210 may include one or more well known clock devices, such as a real-time clock (RTC), oscillators, counters, and the like.

Figure 3:
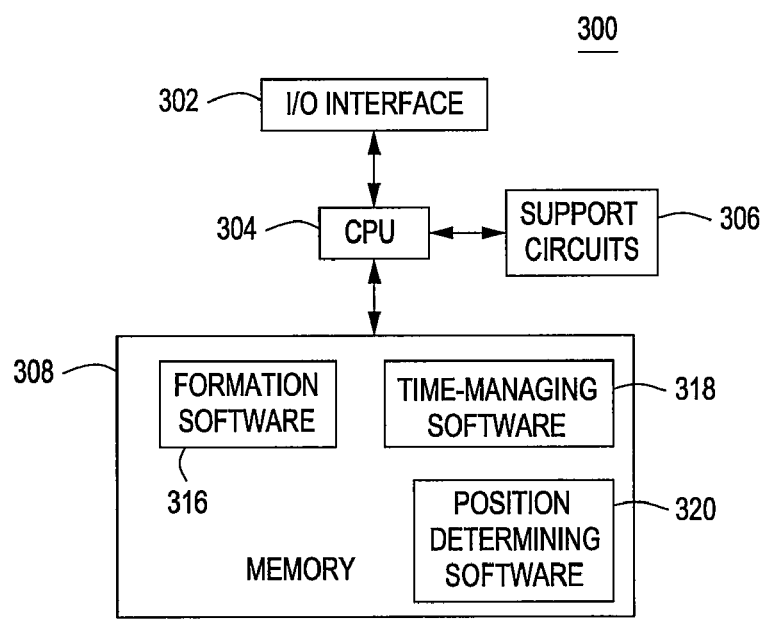
FIG. 3 is a third block diagram depicting an example of a server of a position-location system.

FIG. 3 is a block diagram depicting an example of a server 104 of the position-location system, such as the system 100 shown in FIG. 1. The server 104 illustratively comprises an I/O interface 302, a central processing unit (CPU) 304, support circuits 306, and a memory 308. The CPU 304 is coupled to the memory 308 and the support circuits 306. The memory 308 may be random access memory, read only memory, removable storage, hard disc storage, or any combination of such memory devices. The support circuits 306 include conventional cache, power supplies, clock circuits, data registers, I/O interfaces, and the like to facilitate operation of the server 104. The I/O interface 302 is configured to receive satellite navigation data from the reference network 114. The I/O interface 302 is also configured for communication with the wireless communication network 106.

Figure 4:
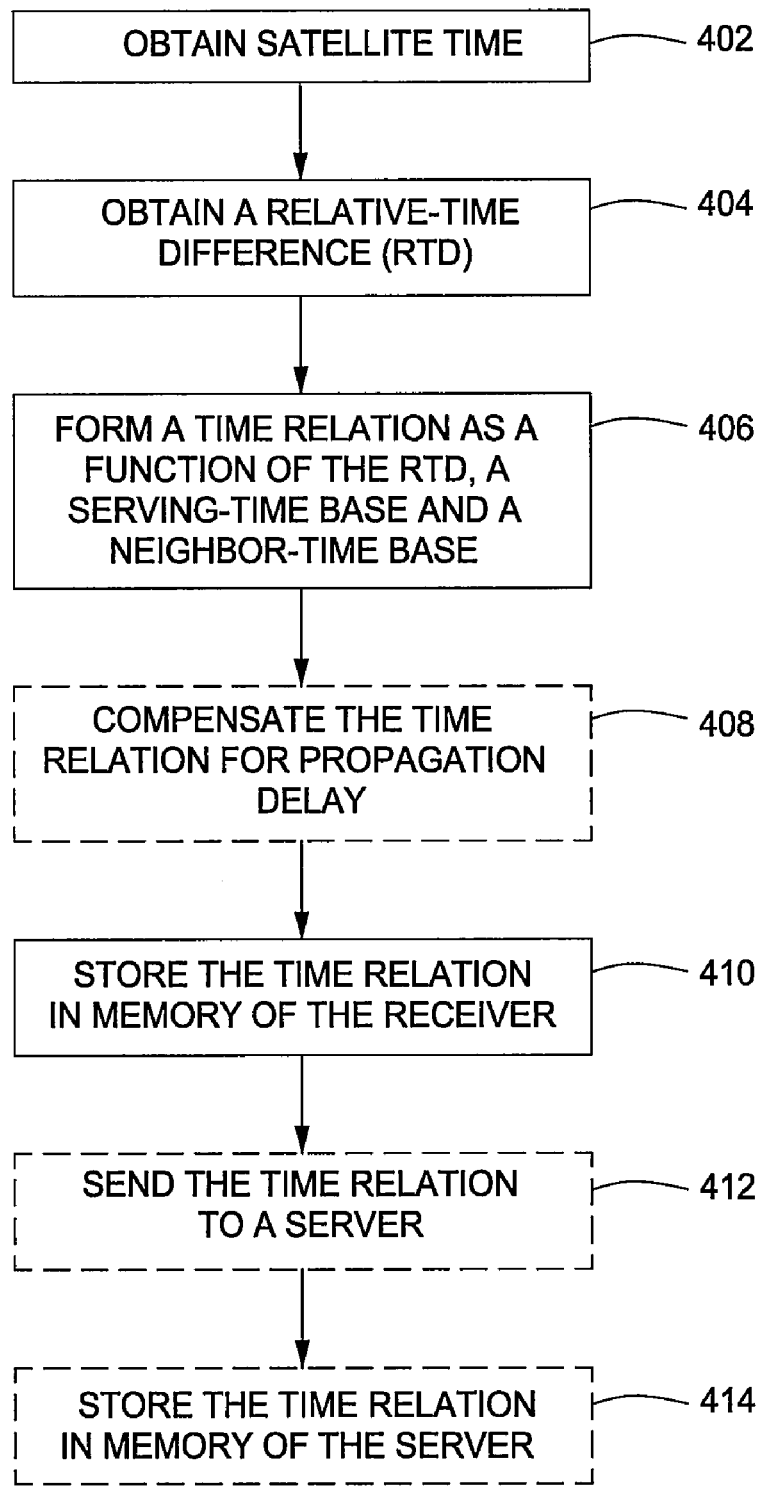
FIG. 4 is a first flow diagram depicting an example of a process for managing time in a position-location system.
Figure 5:
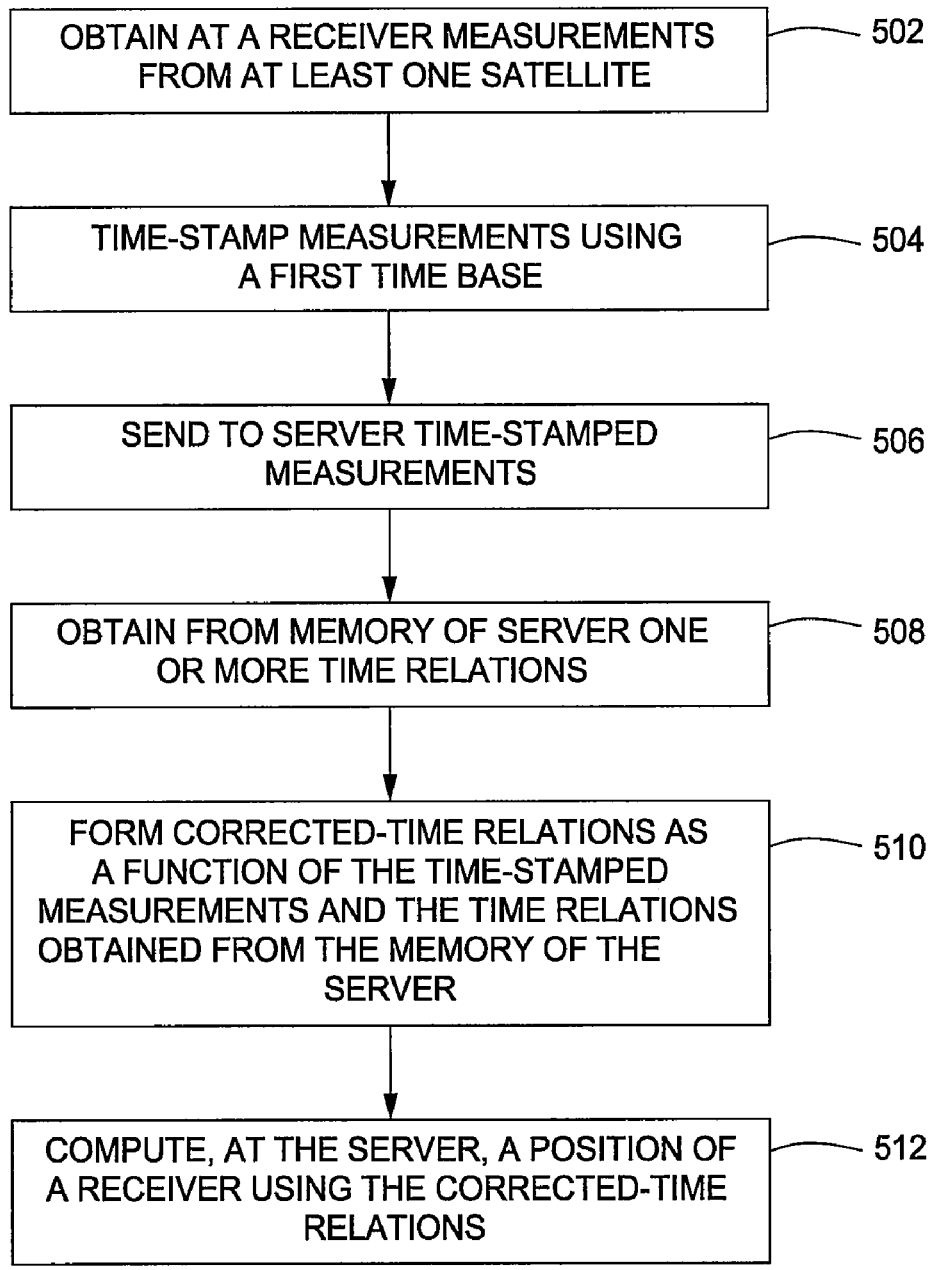
FIG. 5 is second flow diagram depicting an example of a process for determining a position of a remote receiver in a position-location system.
Figure 6:
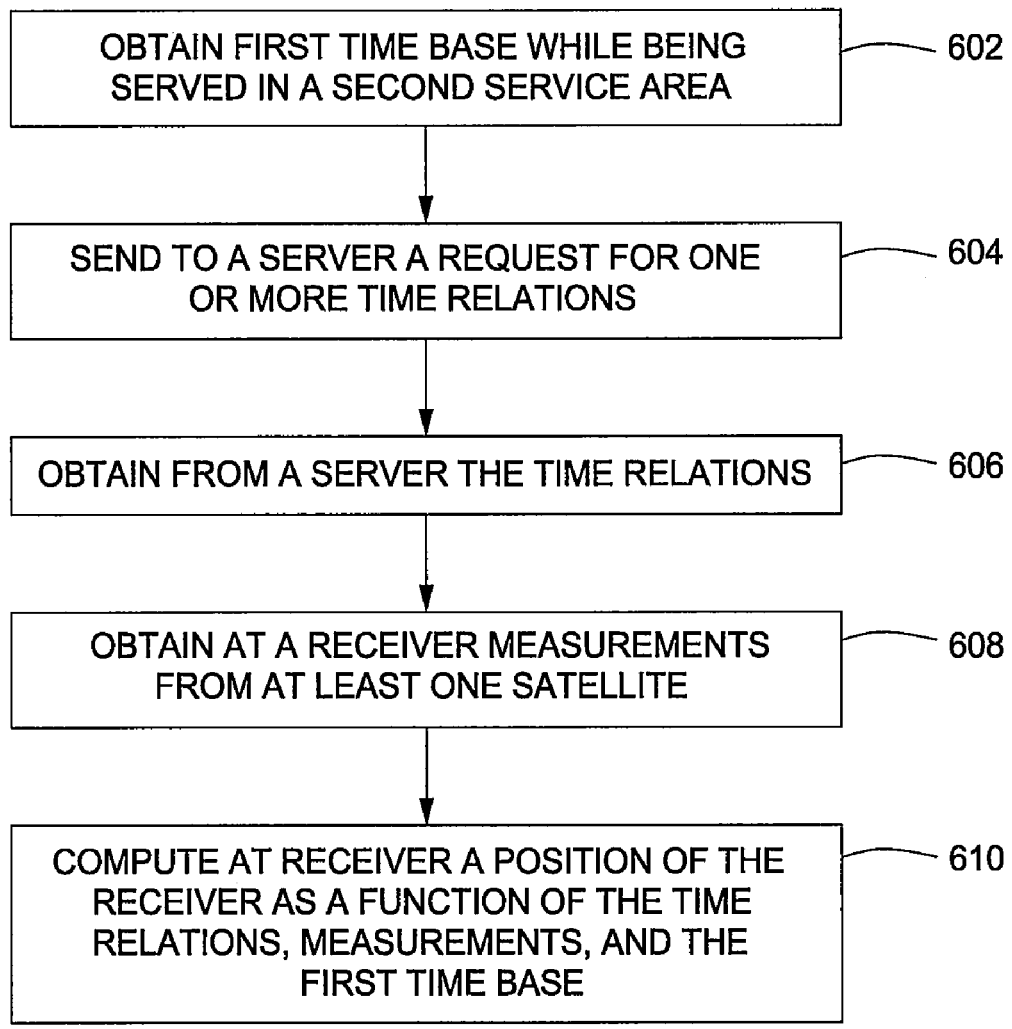
FIG. 6 is a third flow diagram depicting another example of a process for determining a position of a remote receiver in a position-location system.
Figure 8:
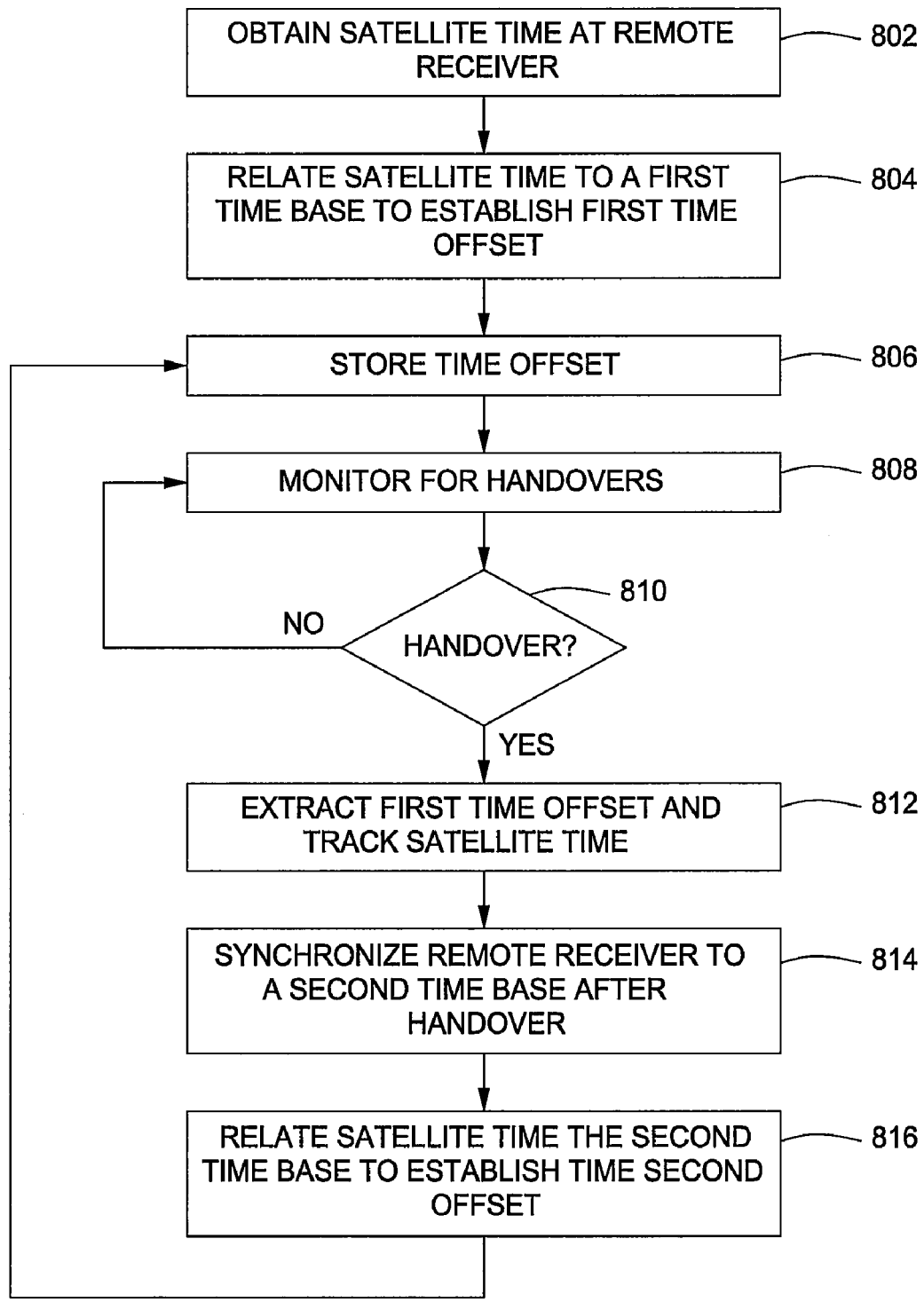
FIG. 8 is a fifth flow diagram depicting another example of a process for managing time in a position-location system.
Figure 9:
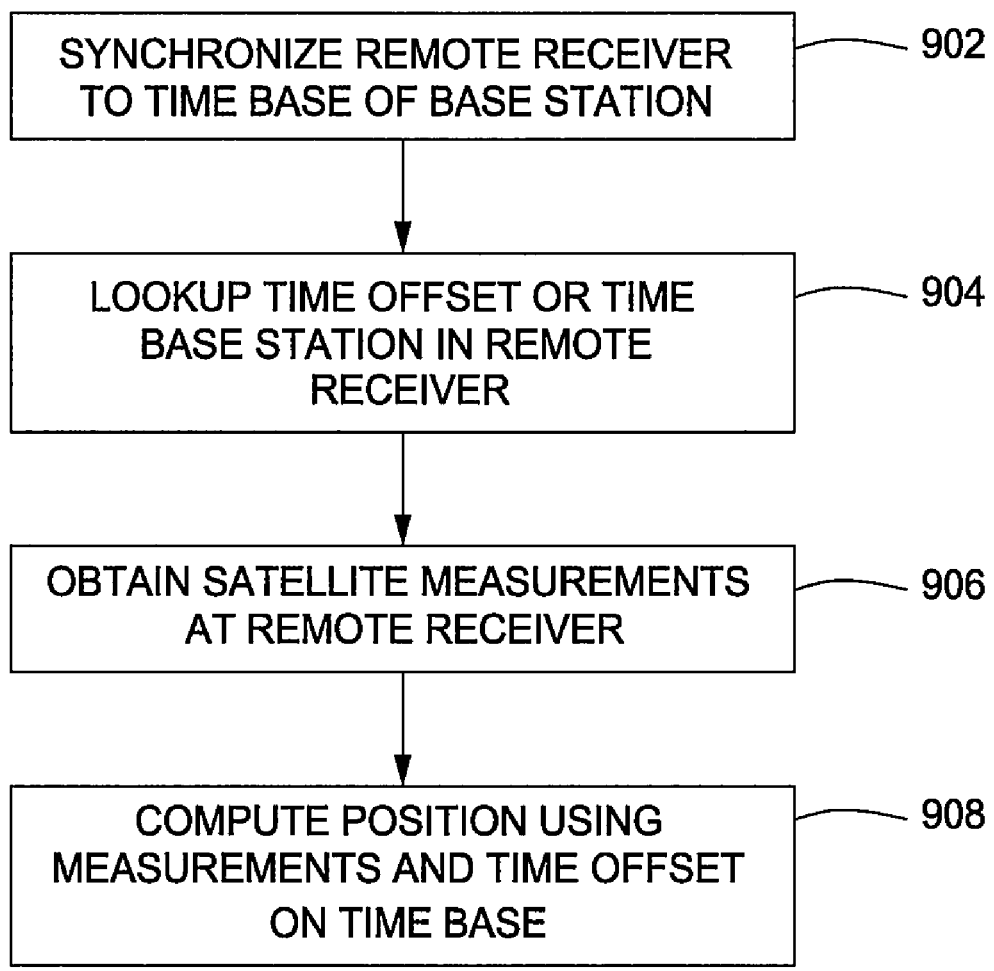
FIG. 9 is a sixth flow diagram depicting another example of a process for determining a position of a remote receiver in a position-location system.

Various processes and methods described herein may be implemented using software, such as (i) time-relation-forming software 316 for performing some or all of a time-relations-forming process (e.g., process illustratively set forth in FIG. 4), (ii) managing-time software 318 for performing some or all of a managing-time process (e.g., processes illustratively set forth in FIG. 8), (ii) position-determining software 320 for performing some or all of a position-determining process (e.g., processes illustratively set forth in FIGS. 5, 6 and 9). This software 316-320 may be stored in the memory 308 for execution by the CPU 304. Alternatively, the server 104 may implement such processes and methods in hardware or a combination of software and hardware, including any number of processors independently executing various programs and dedicated hardware, such as application specific integrated circuits (ASICs), field programmable gate arrays (FPGAs), and the like.

FIG. 4 is a flow diagram depicting an example of a process for forming time relations (time-relation-forming process) 400 in a position-location system, such as a GNSS. The time-relation-forming process 400 may be understood with simultaneous reference to the position-location system 100 of FIG. 1. For purposes of clarity by example, the time-relation-forming process 400 is described with respect to the remote receiver 102A. The process 400 may also be performed by the remote receiver 102B.

The time-relation-forming process 400 begins at process block 402, where GNSS system time is derived or otherwise determined at the remote receiver 102A in the service area 112-1 of the base station 108-1. In one embodiment, the remote receiver 102A may determine GNSS system time by processing satellite signals from the satellites 110 to decode a time-of-week (TOW) value, which may be used to determine GPS time. The process of decoding satellite signals to obtain the TOW value is well known in the art.

In another embodiment, the remote receiver 102A may compute the GNSS system time using a "time-free" navigation solution. Notably, the remote receiver 102A may use a position estimate, a time estimate, and satellite trajectory data along with satellite measurements in a mathematical model to compute absolute time. An exemplary "time-free" navigation solution is described in commonly-assigned U.S. Pat. No. 6,734,821, issued May 11, 2004, which is incorporated by reference herein in its entirety.

At process block 404, the remote receiver 102A obtains the RTD. To facilitate this, the mobile receiver 102A may measure the serving-time base and neighbor-time base. The serving-time base and neighbor-time base may be, include or be formed from, for example, the first and second air-interface timing from the first and second base stations 108-1, 108-2, respectively. The remote receiver 102A may obtain the first and second air-interface times by monitoring, storing, and/or deriving from the wireless signals (e.g., from GSM frames in a GSM network) broadcast or otherwise transmitted from the first and second base stations 108-1, 108-2, respectively.

The remote receiver 102A may obtain the first and second interface times from both the first and second base stations 108-1, 108-2 when operating in the first serving area 112-1. For example, the remote receiver 102A may obtain the first and second air-interface times by synchronizing to the respective first and second air-interface timing of the first and second base stations 108-1, 108-2 while operating in the first serving area 112-1, and then deriving the first and second air-interface times therefrom.

Alternatively, the remote receiver 102A may obtain the first and second air-interface times by synchronizing to the first air-interface timing of the first base station 108-1, and (ii) detecting the second air-interface timing of the second base station 108-2 while operating in the first serving area 112-1. Thereafter, the remote receiver 102A may derive the first air-interface time from signals used to synchronize the remote receiver 102A to the first base station 108-1, and derive the second air-interface time from the signals emanating from the second base station 108-2 and detected by the remote receiver 102A.

As another alternative, the remote receiver 102A may obtain the first and second interface times from the first and second base stations 108-1, 108-2, respectively, after operating in the both of the first and second serving areas 112-1, 112-2. For example, the remote receiver 102A may obtain the first and second air-interface times by (i) synchronizing to the second air-interface timing of the second base station 108-2 while operating in the second serving area 112-2, and then after moving into the first serving area 112-1, (ii) synchronizing to the first air-interface timing of the first base station 108-1. Thereafter, the first and second air-interface times are derived as described above.

The remote receiver 102A may store the RTD, the serving-time base and neighbor-time base along with a reference to the first base station 108-1 and/or the second base station 108-2. After process block 404, the time-relation-forming process 400 transition to process block 406.

At process block 406, a time relation is formed as a function of the RTD, serving-time base and the GNSS system time. In one embodiment, the time relation may be established between TOW values and frame numbers of the wireless signals transmitted by the base stations 108-1, 108-2. In another embodiment, the time relation may be a time offset computed between each of the first and second air-interface times and the satellite time, respectively. In another embodiment, the time relation is formed between frame timing of the base station 108-1, TOW and the RTD Other relationships between the first and second air-interface times and satellite time may be formed as well. As another alternative, the time relation may be formed by applying the first time base to the RTD to determine the second time base; and forming the time relation as a function of the second and the GNSS system time.

At process block 408, the time relation are optionally compensated for propagation delay between the remote receiver 102A and the base station 108-1 (given the remote receiver 102A is operating in serving area 112-1) so as to form a compensated time relation before storing in memory 208 (process block 410) and/or propagating the compensated time relation to the server 104 (process block 412). In one embodiment, the remote receiver 102A forms the compensated time relation by appending a timing advance value to each of the first and second time bases. In addition to or in lieu of the propagation delay between the base station 108-1 and the remote receiver 102A, the base station 108-1 may append a timing advance value, such as described below, to the compensated (or uncompensated) time relation.

Notably, TDMA communication systems compensate for the effect of propagation delay by synchronizing the arrival of transmissions from variously located mobile receivers (such as the remote receivers 102) to slotted frame structures used by base stations (such as the first and second base stations 108-1, 108-2). To synchronize transmissions from the mobile receivers located in a service area of a serving base station, the serving base station typically transmits a timing advance (TA) value to each of the mobile receivers. Responsively, such mobile receivers advance their transmissions to the serving base station according to the TA values to compensate for the propagation delay between the mobile receiver and the serving base station. Typically, the TA values cause the mobile receivers to advance their uplink transmissions (i.e., transmissions to the serving base station) such that these uplink transmissions from the mobile receivers served by the serving base station arrive at the serving base station in synchronism with a common receive frame structure. Such a timing advance technique is well known in the art. Other air interfaces such as WCMDA in UMTS use a similar quantity referred to as Round Trip Timing (RTT).

At process block 410, the compensated or uncompensated time relation is stored locally in memory 208 for later use by the remote receiver 102A. The remote receiver 102A, for example, may use the compensated (or uncompensated) time relation for acquiring one or more of the satellites 110, computing its position, and other functions involving the satellite signals. As described in more detail below, the time relation for the first and second base stations 108-1, 108-2 may be used in a position-location process of the remote receivers 102A, 102B when being served in any of the service areas 112-1, 112-2.

Alternatively, the remote receiver 102A may derive and store in its memory 208 a second time relation or a time-relation model (e.g., a mathematical equation) as a function the compensated (or uncompensated) time relation. This second time relation or time-relation model may, for example, relate the compensated (or uncompensated) time relation to another compensated (or uncompensated) time relation. In addition, the second time relation and/or the time-relation model may be stored in the memory 208 in lieu of the compensated (or uncompensated) time relation. This beneficially preserves an amount of free space of the memory 208 otherwise used to store each of the time relations.

For simplicity, the first and any other time relations, whether compensated or uncompensated, may be referred to hereinafter without denoting whether they are compensated or uncompensated. These time relations, however, may be either compensated or uncompensated. Similarly, the time-relation model may be formed with and/or form compensated or uncompensated time relations, even though not specifically noted.

In addition, the first and any other time relations and/or the time-relation model may be stored along with designations associated with the respective coverage areas of the cell sites. These designations may be, for example, identifiers or other emanated signal signatures associated to the first and second base stations 108-1, 108-2. The identifiers may be, for example, cellular identifications (cell-IDs) assigned to or otherwise given to the first and second base stations 108-1, 108-2.

Like above, the remote receiver 102A may derive and store in its memory 208 a relational-designation model (e.g., a mathematical equation) as a function the designations. The relational-designation model may, for example, relate each of the designations to beneficially preserve an amount of free space of the memory 208 otherwise used to store each of the designations.

Alternatively and/or additionally, the remote receiver 102A may propagate the first and any other time relations and/or the time-relation model to the server 104 for storage and later retrieval, as shown in process block 412. In one embodiment, the first and other time relations and/or the time-relation model are sent to the server 104 using a GPS measurement information element defined in ETSI TS 101 527, version 7.15.0 (also known as 3GPP TS 04.31 and referred to herein as TS 4.31), which is incorporated by reference herein in its entirety.

Notably, TS 4.31 defines a GPS measurement information element for transmitting satellite measurements from the remote receiver 102A to the server 104 in an MS-assisted configuration. As shown in Table A.5 of TS 4.31 (reproduced below), the GPS measurement information element includes fields from reference frame, GPS TOW, the number of satellites to which measurements have been made, and the satellite measurement information. The presence column relates to whether the field is mandatory (M) or optional (O). The occurrences column relates to the number of times the given field is present in the information element.

TABLE A.5

| Element fields | Presence | Occurrences |
| --- | --- | --- |
| Reference Frame | O | 1 |
| GPS TOW | M | 1 |
| # of Satellites (N_SAT) | M | 1 |
| Measurement Parameters | M | N_SAT |

The first and other time relations and/or the time-relation model may be sent to the server 104 using (i) the GPS TOW field for providing the TOW value obtained at process block 402, and (ii) the Reference Frame field for providing the frame number associated with the TOW value at process block 404. At process block 414, the first and other time relations and/or the time-relation model may be stored in the memory 308 of the server 104. The first and other time relations and/or the time-relation model may be stored along with the designations associated with the respective coverage areas of the cell sites.

The server 104 may obtain the designations for the cell sites from the remote receiver 102A when the remote receiver 102A sends the first and other time relations and/or the time-relation model to the server 104. The time of sending, however, in not determinative. That is, the designations may be sent along with or separate from, but associated with the first and other time relations and/or the time-relation model.

Alternatively, the server 104 may obtain the designations for the cell sites from the cell sites themselves. For example, the server 104 may inspect a call routing scheme of communications between the server 104 and the remote receiver 102A to determine which of the first and second base stations 108-1, 108-2 is serving the remote receiver 102A, and using this information the server 104 can determine (e.g., extract) the designation.

The time-relation-forming process 400 may be repeated with respect to various base stations in the wireless communication network 106 such that the remote receiver 102A and/or the server 104 accumulates, updates and/or maintains a collection of time relations and/or one or more time-relation models associated with these various base stations.

Using the collection of time relations and/or one or more time-relation models locally stored in memory 208 and/or obtaining from the server 104 the collection of time relations and/or one or more time-relation models obviates the need for the remote receiver 102A to determine the satellite time from the satellite signals. In this manner, a single remote receiver, such as the remote receiver 102A, may perform the functions of a conventional LMU for all of the remote receivers in communication with the first and second base station 108-1, 108-2, including, for example, the remote receiver 102B. In turn, this obviates the need for the conventional LMU within the vicinity of the base stations 108-1, 108-2.

FIG. 5 is flow diagram depicting an example of a process 500 for determining a position of a remote receiver of a position-location system, such as a GNSS. This process for determining the position of the remote receiver (hereinafter position-determining process 500) may be deployed using a MS-Assisted or MS-Based configuration. In addition, the position-determining process 500 may be understood with simultaneous reference to the position-location system 100 of FIG. 1.

For purposes of clarity by example, the position-determining process 500 is described with respect to the remote receiver 102B. The position-determining process 500 may also be performed by the remote receiver 102A.

The position-determining process 500 begins at process block 502, where satellite measurements are obtained at the remote receiver 102B while operating (e.g., being served) in the second service area 112-2. These satellite measurements may be pseudoranges to a plurality of satellites using satellite positioning system signals. The process of measuring pseudoranges using satellite positioning system signals is well known in the art.

At process block 504, the satellite measurements are time-stamped using the second time base . The first time base may be the air-interface timing of the second base station 108-2. At process block 506, the time-stamped measurements are sent to the server 104.

At process block 508, the first time relation, which corresponds to the base station 108-2, is obtained from memory 308 of the server 104. As described above, the server 104 may be configured to store a collection of time relations or time-relation models for the base stations of the wireless communication network 106, including the first and second base stations 108-1, 108-2. These time relations may comprise associations between RTD, GNSS system time, and the first time base.

At process block 510, corrected time-stamped measurements are formed using the first time relation. For example, the server 104 may form the corrected time-stamped measurements by using the first time relation to convert a value of the time-stamped measurements as a function of the RTD and GNSS system time.

At process block 512, a position of the remote receiver 102B is computed using the corrected time-stamped measurements. The position computation process is well known in the art.

Although the position-determining process 500 is deployed in an MS-Assisted configuration, the position of the mobile receiver 102 may be determined, as described below, using a like-kind position-determining process and a MS-Based configuration.

Notably, FIG. 6 is a flow diagram depicting another example of a process 600 for determining a position of a remote receiver of a position-location system, such a GNSS receiver. This process for determining the position of the remote receiver (hereinafter position-determining process 600) may be deployed using a MS-Based configuration. In addition, the position-determining process 600 may be understood with simultaneous reference to the position-location system 100 of FIG. 1.

For purposes of clarity by example, the position-determining process 600 is described with respect to the remote receiver 102B. The position-determining process 600 may also be performed by the remote receiver 102A.

The position-determining process 600 begins at process block 602, where the remote receiver 102B obtains the first time base (e.g., the first air-interface timing of the first base station 108-1) while operating in the second serving area 112-2 and being served by the second base station 108-2. At process block 604, the remote receiver 102B sends to the server 104 a request for the first time relation. As an alternative, the remote receiver 102B sends to the server 104 a request for the first, second and/or other time relations and/or the time-relation model. The request may be included in a request for assistance data.

Responsive to the request, the remote receiver 102B, at process block 606, obtains from the server 104 the first time relation and the corresponding designations for the first and second base stations 108-1, 108-2. Alternatively, the remote receiver 102B may obtain from the server 104 the first, second and/or other time relations and/or the time-relation model; and the designations for the first and second base stations 108-1, 108-2 (and/or various other base stations) For simplicity, however, the following exposition references only the first time relation, and a designations that corresponds to the first base station 108-1 (first designation).

The first time relation and the first designations may be sent from the server 104 to the remote receiver 102B using, for example, a GPS assistance data element defined in TS 4.31. Notably, the TS 4.31 defines a GPS assistance data element for providing assistance data to the remote receiver 102B in both an MS-Assisted and an MS-Based configuration.

As shown in Table A.14 of TS 4.31, the GPS assistance data element includes (i) a GPS TOW field for providing a TOW value, and (ii) a frame number, a time slot number and a bit number field for providing the air interface time of the serving base station associated with the TOW value. The remote receiver 102B may use the GPS TOW and the frame fields to obtain knowledge of the GPS time with very high precision (few microseconds) despite the latency of the wireless link and thus improve the positioning performance of the remote receiver 102B. It is well known in the art that a priori knowledge of GNSS system time with high precision helps GNSS receivers with the acquisition of satellite signals and the accuracy of the resulting receiver position.

At process block 606, the remote receiver 102B obtains satellite measurements from one or more of the satellites 110. These satellite measurements may be, for example, pseudoranges to a plurality of satellites. At process block 608, position of the remote receiver 102B is computed using the satellite measurements, the first and second time relations, and the first time base.

To facilitate the computing the position of the remote receiver 102B, the satellite measurements may be time stamped using clock circuitry synchronized to the second time base (e.g., the air-interface timing of the second base station 108-2) because the remote receiver 102B is operating in the second service area 112-2. Assuming that the time relation is formed as a function of the RTD and the GNSS system time, the time relation may be used to convert the time stamps so as to provide the GNSS system time relative to the second time base. The time relation may then be used to provide the GNSS system time.

Alternatively, the satellite measurements may be time stamped using clock circuitry that has been adjusted to track the first time base. Assuming that the time relation is formed relative as a function of the RTD and the GNSS system time, the time relation may be used to convert the time stamps to provide the GNSS system time. In such case, the second time base need not be used.

The position-determining process 600 beneficially allows the remote receiver 102B to determine satellite time using the first and/or other time relations and/or the time-relation model. This way, if the remote receiver 102B is able to obtain time base for any of the cell sites (and not necessarily a cell site serving the remote receiver 102B) it can determine the precise satellite time using the corresponding time relation.

Moreover, the remote receiver 102B can store the time relation and corresponding designation for later use with other cell sites for determining the precise satellite time. This way, the remote receiver 102B can operate autonomously until it moves to a cell site for which it does not have a corresponding time relation or unless one of the time relations for a cell site becomes obsolete due to changes, updates or revisions to the air-interface timing of one or more of the cell sites.

Figure 7:
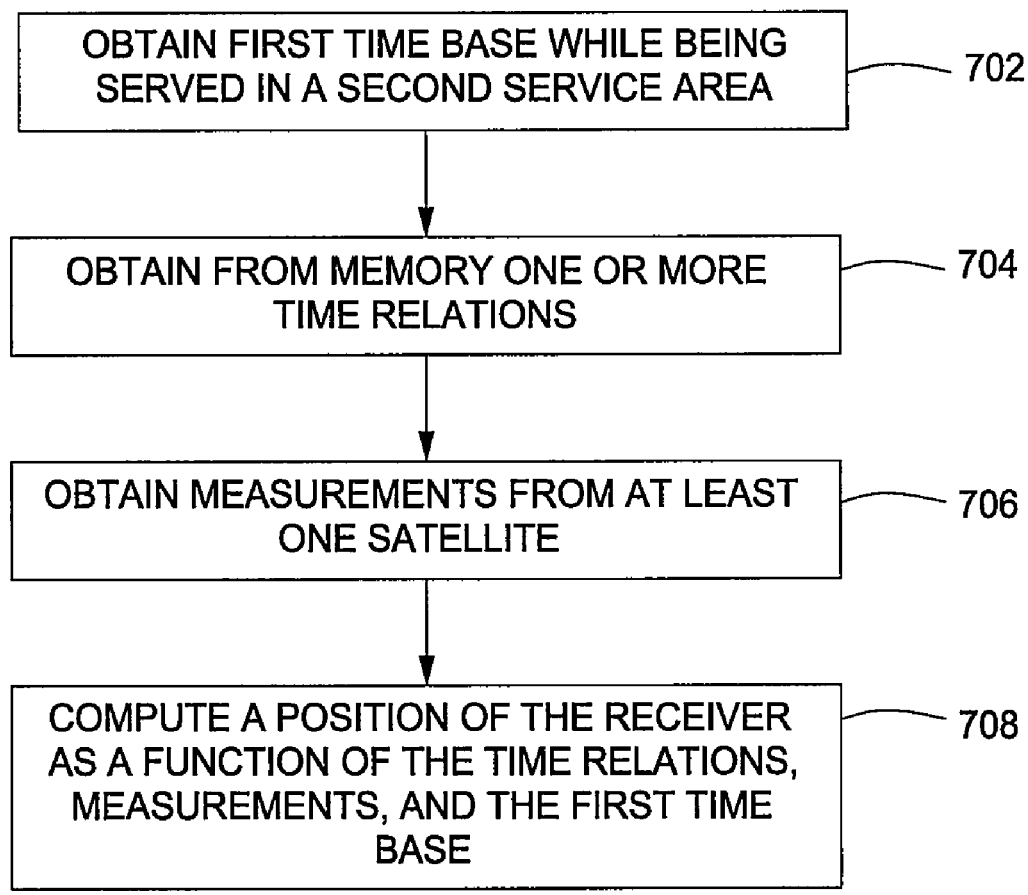
FIG. 7 is a fourth flow diagram depicting another example of a process for determining a position of a remote receiver in a position-location system.

Referring now to FIG. 7, a flow diagram depicting another example of a process 700 for determining a position of a remote receiver of a position-location system, such a GNSS receiver, is shown. This process 700 for determining the position of the remote receiver (hereinafter position-determining process 700) may be deployed using an autonomous configuration. In addition, the position-determining process 700 may be understood with simultaneous reference to the position-location system 100 of FIG. 1.

For purposes of clarity by example, the position-determining process 700 is described with respect to the remote receiver 102B. The position-determining process 700 may also be performed by the remote receiver 102A.

The position-determining process 700 begins at process block 702, where the remote receiver 102B obtains the first time base while operating in the second serving area 112-2 and being served by the second base station 108-2. At process block 704, the remote receiver 102B obtains from its memory 208 the first and second time relations, which may have been formed via the time-relation-forming process 400 (FIG. 4) or other time relation forming process.

As an alternative, the remote receiver 102B may obtain from its memory 208 another time relation and/or the time-relation model in addition to or instead of the first and second time relations. To facilitate obtaining the first, second and/or other time relations and/or the time-relation model, the remote receiver 102B may use the corresponding designations for the first and second base stations 108-1, 108-2 (and/or various other base stations)

At process block 706, the remote receiver 102B obtains satellite measurements from one or more of the satellites 110. These satellite measurements may be, for example, pseudoranges to a plurality of satellites. At process block 708, position of the remote receiver 102B is computed using the satellite measurements; the air-interface timing of the first base station 108-1; and/or the first, second and/or third time relations and/or the time-relation model.

To facilitate the computing the position of the remote receiver 102B, the satellite measurements may be time stamped using clock circuitry synchronized to the second time base because the remote receiver 102B is operating in the second service area 112-2. Assuming that the time relation is formed as a function of the RTD, GNSS system time and the first time base, the time relation may be used to convert the time stamps so as to provide the GNSS system time relative to the second time base. The time relation may then be used to provide the GNSS system time.

Alternatively, the satellite measurements may be time stamped using clock circuitry that has been adjusted to track the first time base. Assuming that the time relation is formed as a function of the RTD, GNSS system time and the first time base, the time relation may be used to convert the time stamps to provide the GNSS system time. In such case, the second time base need not be used.

The position-determining process 700 beneficially allows the remote receiver 102B to determine satellite time using the first and/or other time relations and/or the time-relation model. As above, if the remote receiver 102B is able to obtain the time bases for any of the cell sites (and not necessarily a cell site serving the remote receiver 102B) it can determine, using the corresponding time relations, the precise GNSS system time.

Because the remote receiver 102B stores and/or maintains the time relations and corresponding designations for later use with other cell sites, it can determine the precise satellite time when operating in any cell site for which it possesses a corresponding time relation. This way, the remote receiver 102B can operate autonomously until it moves to a cell site for which it does not have a corresponding time relation or unless one of the time relations for a cell site becomes obsolete due to changes, updates or revisions to the air-interface timing of one or more of the cell sites. In such case, the remote receiver 102B can perform the time-relation-forming process 400 (FIG. 4) or other time relation forming process.

In another embodiment, time is managed by storing at the remote receiver 102B time offsets between GNSS system time and the time bases of base stations within the wireless communication network 106. The present embodiment may be used regardless of the configuration of the position-location system 100 (e.g., MS-Assisted, MS-Based, autonomous) and may be used to determine precise time-of-day. For example, in the present embodiment, satellite time may be determined to within 100 microseconds.

In particular, FIG. 8 is a flow diagram depicting another example of a process for managing time (managing-time process) 800 in a position-location system, such as a GNSS. This managing-time process 800 may be understood with simultaneous reference to the position-location system 100 of FIG. 1. For purposes of clarity by example, the managing-time process 700 is described with respect to the remote receiver 102A. The managing-time process 800 may also be performed by the remote receiver 102B.

The managing-time process 800 begins at process block 802, where satellite time is obtained at the remote receiver 102A in the service area 112-1 of the base station 108-1. Hitherto, the remote receiver 102A has no knowledge of precise satellite time. The remote receiver 102A may, for example, determine satellite time by processing satellite signals from the satellites 110 to decode a TOW value, which in turn, may be used to determine GNSS system time. In another embodiment, the remote receiver 102A may compute satellite time using a "time-free" navigation solution using for example, the time free process noted above.

At process block 804, the derived satellite time is related to the first time base to produce a first time offset. For example, the first time offset may be formed as a function of the frame timing of the signals emanating from the base station 108-1 and GNSS system time. Given that a clock of the base station 108-1 is highly accurate and frame timing is synchronous, accuracy of the first time offset is maintained.

At process block 806, the first time offset is stored within the memory 208 of remote receiver 102A. The first time offset stored in the remote receiver 102A typically occupies very little amount of memory (e.g., 8 to 20 bytes).

Once the first time offset is stored in memory, the remote receiver 102A may go to sleep, be turned off, or otherwise be deactivated. When the remote receiver 102A is re-activated and detects signals from the first base station 108-1 that match the first time offset, the remote receiver 102A may establish precise satellite time using the first time offset. The clock circuitry of the remote receiver 102A may include a real time clock to resolve any network rollover ambiguities.

When the remote receiver 102A is handed off from the first base station 108-1 to the second base station 108-2, a second time offset may be used to overcome the timing relationship that could otherwise be lost in networks that do not synchronize each of the base stations to a common timing (e.g., GSM). Thus, at process block 808, the remote receiver 102A monitors for handovers. Optionally, the remote receiver 102A may model the drift of the clock of the first base station 108-1 (and/or other base station). Notably, the remote receiver 102A may make an accurate estimate of the long term drift rate of the base station clock as long as the remote receiver 102A remains in the service area of the first base station. In this manner, the remote receiver 102A may improve the time offset stored for the base station 108-1 (and/or other base station).

At process block 810, a determination is made as to whether the remote receiver 102A has been instructed to hand over to the second base station 108-2. If not, the managing-time process 800 returns to process block 808. If so, the managing-time process 700 proceeds to process block 812.

At process block 812, the first time offset for the first base station 108-1 (or other time relation between the GNSS system time, the first time. base and the second time base) is extracted and used to track satellite time in the remote receiver 102A. For example, the remote receiver 102A may use the first time offset to transfer the GNSS system time to counter circuitry during the handover.

At process block 814, the remote receiver 102A synchronizes to the second time base after the handover. Using the first time offset, the remote receiver 102A continues to track satellite time. At process block 816, the GNSS system time is related to the second time base to establish a second time offset for the second base station 108-2.

The time-managing process 800 may then return to process block 806 to store in memory the second time offset, and/or the RTD. In this manner, the remote receiver 102A may store and maintain a collection of time offsets for a number of base stations, including the first and second base stations 108-1, 108-2, in the wireless communication network 106.

Because the first and second time bases are obtained every time the remote receiver 102A synchronizes to the one of the base stations 108-1, 108-2, respectively, which has to (and typically) occurs each time the remote receiver 102A needs to communicate with communication network 106, the remote receiver 102A does not have to transmit signals to obtain this time relationship. Consequently, no power is consumed during idle states. In addition, the remote receiver 102A can be totally powered down, restarted, and thereafter obtain precise satellite time for any cell site for which it has or can obtain a corresponding one of the time relations without obtaining the precise satellite time from an external source. Thus, the present invention saves power, while preserving precise satellite time. In addition, network frame counters are synchronous and stationary. Any Doppler shift caused by moving effects would be removed.

Many cellular telephones that have integrated A-GPS receivers include hardware for performing timing comparisons. Thus, the managing-time process 800 may be used to provide time management traditionally provided by conventional LMUs. This managing-time process 800 supplants obtaining precise satellite time from an external source with measuring time locally within the remote receiver 102A. As such, the remote receiver 102A obviates the need for providing a conventional LMU within the vicinity of the base stations 108-1,108-2.

FIG. 9 is a flow diagram depicting another example of a process for determining position of a remote receiver (position-determining process) 900 in a position-location system, such as a GNSS. The position-determining process 900 may be understood with simultaneous reference to the position-location system 100 of FIG. 1. For purposes of clarity by example, the position-determining process 900 s described with respect to the remote receiver 102A. The position-determining process 900 may also be performed by the remote receiver 102B.

The position-determining process 900 begins at process block 902, where the remote receiver 102A synchronizes to the first time base, and thus, obtains the designation of the cell site (i.e., the first designation). At process block 904, the remote receiver obtains from its memory 208 the time relation or time offset for the base station 108-1, which corresponds to the first designation.

As described above, the remote receiver 102A may be configured to store a collection of time offsets, where each of the time offsets comprises an offset between the air-interface timing of its respective base station and satellite time. Alternatively and/or additionally, the remote receiver 102A may be configured to store a collection of time relations formed as a function of the GNSS system time and the time bases of at least two base stations. Each of these time relations, for example, may have a given relationship to (e.g., an offset from) a time relation formed between the GNSS system time, an RTD between time bases of at least two base stations and a time base of one of the two base stations.

At process block 906, the remote receiver 102A obtains satellite measurements from one or more of the satellites 110. These satellite measurements may, for example, be pseudoranges to a plurality of satellites. At process block 906, the remote receiver 102A may compute its position using the satellite measurements, and one or more of the time offsets or time relations.

To facilitate the computing the position of the remote receiver 102A, the satellite measurements may be time stamped using clock circuitry synchronized to the first time base because the remote receiver 102A is operating in the first service area 112-1. Assuming that the time offset and/or the time relation is formed as a function of the RTD, GNSS system time and the first time base, the time offset or time relation may be used to convert the time stamps so as to provide the precise GNSS system time.

Alternatively, the satellite measurements may be time stamped using clock circuitry that has been adjusted to track the second time base. Assuming that the time offset and/or the time relations is formed relative as a function of the RTD, GNSS system time and the first time base, the time offset or time relation may be used to convert the time stamps to provide the time offset and/or time relation relative to the satellite time. In turn, the first time offset may be used to obtain the precise GNSS system time.

The position-determining process 900 beneficially allows the remote receiver 102A to determine GNSS system time using the time offset and/or the time relation. As above, if the remote receiver 102A is able to obtain air-interface timing for any of the cell sites (and not necessarily a cell site serving the remote receiver 102A) it can determine, using the corresponding time relations, the precise GNSSS system time.

Because the remote receiver 102A stores and/or maintains the time offsets and/or time relations and corresponding designations for later use with other cell sites, it can determine the precise satellite time when operating in any cell site for which it possesses a corresponding time relation. This way, the remote receiver 102A can operate autonomously until it moves to a cell site for which it does not have a corresponding time offset or relation or unless one of the time offsets or relations for a cell site becomes obsolete due to changes, updates or revisions to the its air-interface timing. In such case, the remote receiver 102A can perform the time-relation-forming process 400 (FIG. 4), time-managing process 800 (FIG. 8) or other time relation forming process.

In the preceding discussion, the foregoing has been described with reference to application upon the GPS provided by the United States Government, which is just one example of a GNSS. It should be evident, however, that the foregoing is equally applicable to various other GNSSs, and in particular, the Russian GLONASS system, the European GALILEO system; combinations of the GNSSs; and combinations of the GNSSs and other satellites, pseudolites, etc. that provide signals associated with, augmented for, derived from or otherwise modified for the GNSS, including, for example, the wide area augmentation system (WAAS) and SBAS. Accordingly, the term "GPS" used herein includes such alternative GNSSs, including the Russian GLONASS system, the European GALILEO system, the WMS system, and the SBAS system, as well as combinations thereof.

Variations of the apparatus and method described above are possible without departing from the scope of the invention. For instance, in the examples described above, controllers and other devices containing processors are noted. These devices may contain at least one Central Processing Unit ("CPU") and a memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the examples are not limited to the above-mentioned memories and that other platforms and memories may support the described methods.

In view of the wide variety of embodiments that can be applied, it should be understood that the illustrated examples are exemplary only, and should not be taken as limiting the scope of the following claims. Further, the claims should not be read as limited to the described order or elements unless stated to that effect. In addition, use of the term "means" in any claim is intended to invoke 35 U.S.C. §112, ¶6, and any claim without the word "means" is not so intended.

I claim:

1. A method comprising:
    obtaining, at a given global-navigation-satellite-system receiver while being served by a first node of a wireless network, a first time base, wherein the first time base is associated with the first node;
    obtaining, at the given global-navigation-satellite-system receiver while being served by the first node, a relative-time difference, wherein the relative-time difference comprises a difference between the first time base and a second time base associated with a second node of the wireless network;
    obtaining at the given global-navigation-satellite-system receiver a third time base, wherein the third time base is associated with a constellation of satellites; and
    forming a time relation as a function of the first time base, the relative-time difference and the third time base.

2. The method of claim 1, further comprising:
    computing, as function of the time relation, at least one position of any of (i) the given global-navigation-satellite-system receiver, and (ii) another global-navigation-satellite-system receiver.

3. The method of claim 2, further comprising:
    obtaining, at any of the given global-navigation-satellite-system receiver and the another global-navigation-satellite-system receiver from a database, the time relation.

4. The method of claim 1, further comprising:
    providing the time relation to a database.

5. The method of claim 1, further comprising:
    storing the time relation at the given global-navigation-satellite-system receiver, wherein the given global-navigation-satellite-system receiver is operable to compute, as a function of the time relation, a position of the given global-navigation-satellite-system receiver.

6. The method of claim 1, wherein the third time base is an absolute time associated with the constellation.

7. The method of claim 1, further comprising:
    using the time relation as an estimate of absolute time.

8. The method of claim 1, further comprising:
    using the time relation to form an estimate of absolute time; and
    using the estimate of absolute time to increase sensitivity of the given global-navigation-satellite-system receiver.

9. The method of claim 1, further comprising:
    using the time relation to form an estimate of absolute time; and
    using the estimate of absolute time to decrease a time for computing at least one position of any of (i) the given global-navigation-satellite-system receiver, and (ii) a another global-navigation-satellite-system receiver.

10. The method of claim 1, wherein forming the time relation comprises:
    applying the first time base to the relative-time difference to determine the second time base; and
    forming the time relation as a function of the second and third time bases.

11. The method of claim 10, wherein forming the time relation comprises:
    determining a difference between the second and third time bases; and
    offsetting the difference from the third time base.

12. The method of claim 11, further comprising:
    computing, as function of the time relation, at least one position of any of (i) the given global-navigation-satellite-system receiver being served by the node, and (ii) a another global-navigation-satellite-system receiver being served by the second node.

13. The method of claim 1, further comprising: using the time relation to acquire at least one satellite of the constellation of satellites.

14. A method comprising:
    obtaining at a server a time relation, wherein the time relation is formed as a function of a first time base, a relative-time difference and a third time base; wherein the first time base is obtained, at a given global-navigation-satellite-system receiver while being served by a first node of a wireless network; wherein the first time base is associated with the first node; wherein the relative time difference is obtained at the given global-navigation-satellite-system receiver while being served by the first node; wherein the relative-time difference comprises a difference between the first time base and a second time base associated with a second node of the wireless network; wherein the third time base is obtained at the given global-navigation-satellite-system receiver; and wherein the third time base is associated with a constellation of satellites; and
    providing the time relation to any of (i) the given global-navigation-satellite-system receiver when being served by the second node, and (ii) a another global-navigation-satellite-system receiver when being served by the second node.

15. The method of claim 14, further comprising:
    computing, as function of the time relation, at least one position of any of (i) the given global-navigation-satellite-system receiver, and (ii) the another global-navigation-satellite-system receiver.

16. The method of claim 14, further comprising: storing the time relation at the another global-navigation-satellite-system receiver, wherein the another global-navigation-satellite-system receiver is operable to compute, as a function of the time relation, a position of the another global-navigation-satellite-system receiver.

17. The method of claim 14, wherein the third time base is an absolute time associated with the constellation.

18. The method of claim 14, further comprising:
    using the time relation as an estimate of absolute time.

19. A global-navigation-satellite-system receiver comprising:
    memory adapted to store executable instructions to:
        obtain a first time base while being served by a first node of a wireless network, wherein the first time base is associated with the first node;
        obtain a relative-time difference while being served by the first node, wherein the relative-time difference comprises a difference between the first time base and a second time base associated with a second node of the wireless network;
        obtain a third time base, wherein the third time base is associated with a constellation of satellites; and form a time relation as a function of the first time base, the relative-time difference and the third time base; and a processor adapted to (i) obtain from the memory the executable instructions and (ii) execute the executable instructions.

20. The receiver of claim 19, wherein the executable instructions further comprise: executable instructions to compute, as function of the time relation, at least one position of the given global-navigation-satellite-system receiver.

21. The receiver of claim 19, further comprising:
a transmitter for providing the time relation to a database.

22. The receiver of claim 19, wherein the third time base is an absolute time associated with the constellation.

23. The receiver of claim 19, wherein the executable instructions further comprise:
executable instructions to use the time relation as an estimate of absolute time.

24. The receiver of claim 19, wherein the executable instructions to form the time relation comprise executable instructions to:
apply the first time base to the relative-time difference to determine the second time base; and
form the time relation as a function of the second and third time bases.

25. The receiver of claim 19, wherein the executable instructions to form the time relation comprise executable instructions to:
determine a difference between the second and third time bases; and
offset the difference from the third time base.

26. The receiver of claim 19, wherein the executable instructions further comprise executable instructions to: use the time relation to acquire at least one satellite of the constellation of satellites.

27. A system comprising a first global-navigation-satellite-system receiver, a another global-navigation-satellite-system receiver, and a server, wherein:
the first global-navigation-satellite-system receiver adapted to:
obtain a first time base while being served by a first node of a wireless network, wherein the first time base is associated with the first node;
obtain a relative-time difference while being served by the first node, wherein the relative-time difference comprises a difference between the first time base and a second time base associated with a second node of the wireless network;
obtain a third time base, wherein the third time base is associated with a constellation of satellites; and
form a time relation as a function of the first time base, the relative-time difference and the third time base; and
the server is adapted to:
obtain the time relation from the first global-navigation-satellite-system receiver; and
provide the time relation to any of (i) the first global-navigation-satellite-system receiver, and (ii) the another global-navigation-satellite-system receiver.

* * * * *